(12) United States Patent
Hogan et al.

(10) Patent No.: US 12,481,403 B2
(45) Date of Patent: Nov. 25, 2025

(54) CONTINUOUS TACTILE FEEDBACK FOR ELECTRONIC DEVICES

(71) Applicant: SAMSUNG ELECTRONICS CO., LTD., Suwon-si (KR)

(72) Inventors: Francois Robert Hogan, St-Jean-Sur-Richelieu (CA); Trevor Ablett, Toronto (CA); Xue Liu, Montreal (CA); Gregory Lewis Dudek, Westmount (CA); Amal Feriani, Winnipeg (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/529,852

(22) Filed: Dec. 5, 2023

(65) Prior Publication Data

US 2024/0353958 A1    Oct. 24, 2024

Related U.S. Application Data

(60) Provisional application No. 63/461,162, filed on Apr. 21, 2023.

(51) Int. Cl.
  *G06F 3/042*   (2006.01)
  *G06F 3/03*    (2006.01)
  *G06T 3/02*    (2024.01)
  *G06T 7/73*    (2017.01)

(52) U.S. Cl.
  CPC .......... *G06F 3/0425* (2013.01); *G06F 3/0325* (2013.01); *G06T 3/02* (2024.01); *G06T 7/73* (2017.01); *G06T 2207/30208* (2013.01)

(58) Field of Classification Search
  CPC ....... G06F 3/0425; G06F 3/0325; G06T 3/02; G06T 7/73; G06T 2207/30208
  See application file for complete search history.

(56) References Cited

U.S. PATENT DOCUMENTS

| 10,771,880 B1 | 9/2020 | Hankey et al. | |
| 2003/0178556 A1* | 9/2003 | Tachi | G06F 3/042 250/208.1 |
| 2009/0211820 A1* | 8/2009 | Lin | G06F 3/0425 345/157 |

(Continued)

FOREIGN PATENT DOCUMENTS

CN    114080538 A    2/2022

OTHER PUBLICATIONS

International Search Report and Written Opinion issued on May 23, 2024 by the International Searching Authority for International Patent Application No. PCT/KR2024/095299 (PCT/ISA/220, PCT/ISA/210, and PCT/ISA/237).

*Primary Examiner* — Brent D Castiaux
(74) *Attorney, Agent, or Firm* — Sughrue Mion, PLLC

(57) ABSTRACT

A method performed by an electronic device, includes: obtaining an image of a set of markers; based on the image, detecting an arrangement of the set of markers; based on the arrangement of the set of markers, performing a measurement about a deformation of the set of markers; based on the measurement about the deformation of the set of markers, generating a plurality of signals; transforming the plurality of signals to a plurality of input commands. The plurality of input commands are used to control the electronic device.

11 Claims, 10 Drawing Sheets

(56) References Cited

U.S. PATENT DOCUMENTS

| | | | |
|---|---|---|---|
| 2011/0129154 A1* | 6/2011 | Shimodaira | G06T 7/80 |
| | | | 382/190 |
| 2012/0114254 A1 | 5/2012 | Nakjima | |
| 2013/0076629 A1* | 3/2013 | Lin | G06F 3/0317 |
| | | | 345/166 |
| 2020/0348138 A1* | 11/2020 | Le | G06T 7/20 |
| 2021/0064160 A1* | 3/2021 | Kim | G06F 3/042 |
| 2021/0334584 A1 | 10/2021 | Zheng et al. | |
| 2021/0389872 A1* | 12/2021 | Hogan | G06F 3/0421 |
| 2022/0107682 A1 | 4/2022 | Lutnick et al. | |
| 2022/0397996 A1 | 12/2022 | Lemay et al. | |
| 2023/0124841 A1 | 4/2023 | Wang et al. | |

* cited by examiner

ORIGINAL CONFIGURATION OF
SET OF MARKERS

DEFORMATION OF SET OF
MARKERS $$\underline{408A}$$

$$T = \begin{bmatrix} a & b & c \\ d & e & f \end{bmatrix} = \begin{bmatrix} \cos\theta & -\sin\theta & X \\ \sin\theta & \cos\theta & Y \end{bmatrix} \longrightarrow \begin{matrix} \underline{408B} \\ X \\ Y \\ \theta \end{matrix}$$

$$\theta = \mathrm{atan2}(d, e)$$

FIG. 6

CONTINUOUS TACTILE FEEDBACK FOR ELECTRONIC DEVICES

CROSS-REFERENCE TO RELATED APPLICATIONS

This application is based on and claims priority under 35 U.S.C. § 119 to U.S. Provisional Patent Application No. 63/461,162, filed on Apr. 21, 2023 in the U.S. Patent & Trademark Office, the disclosure of which is incorporated by reference herein in its entirety.

BACKGROUND

1. Field

The disclosure relates to a system and method for increasing sensing or controlling capabilities of electronic devices, for example, earbuds and headphones, by providing continuous tactile feedbacks on a user's inputs.

2. Description of Related Art

Existing electronic devices, for example, wireless earbuds and headphones, may integrate touch sensors based on capacitive sensing and may only detect a limited number of signals. In the existing electronic devices, only a limited number of functionalities are allowed. For example, the wireless earbuds have limited controlling functionalities, such as play/pause (corresponding to a user's one touch on a surface of the wireless earbud), next song (two touches), and previous song (three touches). Thus, there is a need to increase a number of controlling functionalities by adopting a novel scheme.

SUMMARY

Provided are a system and a method using high-resolution tactile sensing that expands the functionalities of the electronic devices (e.g., earbuds and headphones) to include a richer set of operations, such as volume control, fast-forwarding and rewinding, brightness control, identity confirmation, etc. This is enabled by an optical based tactile sensor that would capture a high-resolution image of the tactile surface, from which it is possible to extract a limitless number of user functions.

According to an aspect of the disclosure, a method performed by an electronic device, includes: obtaining an image of a set of markers: based on the image, detecting an arrangement of the set of markers; based on the arrangement of the set of markers, performing a measurement about a deformation of the set of markers: based on the measurement about the deformation of the set of markers, generating a plurality of signals: transforming the plurality of signals to a plurality of input commands. The plurality of input commands are used to control the electronic device.

In one embodiment, the obtaining the image of the set of markers includes capturing the image of the set of markers by a camera of the electronic device.

In one embodiment, the detecting the arrangement of the set of markers includes detecting the arrangement of the set of markers based on an analysis of the image by at least one processor of the electronic device.

In one embodiment the performing the measurement about the deformation of the set of markers includes: comparing an original configuration of the set of markers with the deformation of the set of markers and generating a comparison result, and calculating the measurement based on the comparison result between the original configuration of the set of markers and the deformation of the set of markers.

In one embodiment, the generating the plurality of signals includes: extracting an affine transform from the deformation of the set of markers, and generating the plurality of signals using the affine transform.

In one embodiment, the generating the plurality of signals includes generating the plurality of signals using a vision transformer.

In one embodiment, the plurality of signals include a first coordinate (X) displacement, a second coordinate (Y) displacement, and an angle (Q) displacement.

In one embodiment, the plurality of signals include a first coordinate (X) displacement, a second coordinate (Y) displacement, and an angle (Q)) displacement.

According to an aspect of the disclosure, a method performed by an electronic device, includes: obtaining an image of a set of markers: based on the image, detecting an arrangement of the set of markers: based on the arrangement of the set of markers, performing, during a predetermined time, a plurality of measurements about a plurality of deformations of the set of markers: determining whether a number of the plurality of deformations of the set of markers are higher than a predetermined number: based on a first determination that the number of the plurality of deformations of the set of markers are higher than the predetermined number and based on the plurality of deformations of the set of markers, generating a plurality of signals; and transforming the plurality of signals to a first set of input commands. The first set of input commands are used to control the electronic device.

In one embodiment, the method further includes, based on a second determination that the number of the plurality of deformations of the set of markers is equal to or lower than the predetermined number, mapping the plurality of deformations of the set of markers to a second set of input commands.

In one embodiment, the obtaining the image of the set of markers includes capturing the image of the set of markers by a camera of the electronic device.

In one embodiment, the detecting the arrangement of the set of markers includes detecting the arrangement of the set of markers after analyzing the image by at least one processor of the electronic device.

In one embodiment, the performing, during the predetermined time, the plurality of measurements about the plurality of deformations of the set of markers includes: comparing an original configuration of the set of markers with the plurality of deformations of the set of markers and generating a comparison result, and calculating the plurality of measurements based on the comparison result between the original configuration of the set of markers and the plurality of deformations of the set of markers.

In one embodiment, the generating the plurality of signals includes: extracting an affine transform from the deformation of the set of markers, and generating the plurality of signals using the affine transform.

In one embodiment, the generating the plurality of signals includes generating the plurality of signals using a vision transformer.

In one embodiment, the plurality of signals include a first coordinate (X) displacement, a second coordinate (Y) displacement, and an angle (Q)) displacement.

In one embodiment, the plurality of signals include a first coordinate (X) displacement, a second coordinate (Y) displacement, and an angle (Q) displacement.

According to an aspect of the disclosure, an electronic device includes: a camera: at least one memory storing at least one instruction: at least one processer operatively connected to the camera and the at least one memory. The at least one processor is configured to execute the at least one instruction to: obtain an image of a set of markers; based on the image, detect an arrangement of the set of markers: based on the arrangement of the set of markers, perform a measurement about a deformation of the set of markers; based on the measurement about the deformation of the set of markers, generate a plurality of signals; and transform the plurality of signals to a plurality of input commands. The plurality of input commands are used to control the electronic device.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 shows an affine transform extracted from the deformation of the markers and a plurality of signals (a first coordinate (X) displacement, a second coordinate (Y) displacement, and an angle (Θ) displacement) generated using the affine transform, in accordance with some embodiments of the disclosure:

DETAILED DESCRIPTION

Figure 1:
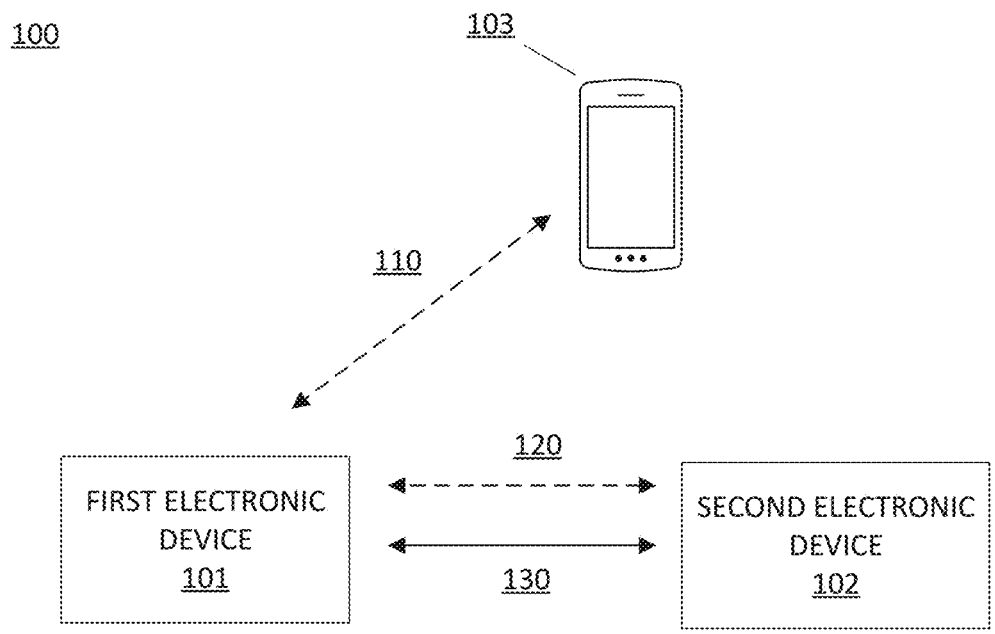
FIG. 1 illustrates an example of an environment (system) including a first electronic device ("an electronic device"), a second electronic device, and an audio source device (e.g., a smart phone) in accordance with some embodiments of the disclosure.

The terms as used in the disclosure are provided to merely describe specific embodiments, not intended to limit the scope of other embodiments. Singular forms include plural referents unless the context clearly dictates otherwise. The terms and words as used herein, including technical or scientific terms, may have the same meanings as generally understood by those skilled in the art. The terms as generally defined in dictionaries may be interpreted as having the same or similar meanings as or to contextual meanings of the relevant art. Unless otherwise defined, the terms should not be interpreted as ideally or excessively formal meanings. Even though a term is defined in the disclosure, the term should not be interpreted as excluding embodiments of the disclosure under circumstances.

The electronic device according to one or more embodiments may be one of various types of electronic devices. The electronic devices may include, In one embodiment, a portable communication device (e.g., a smartphone), a computer device, a portable multimedia device, a portable medical device, a camera, a wearable device, earbuds, or a home appliance. According to an embodiment of the disclosure, the electronic devices are not limited to those described above.

The disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with the disclosure, the term "module" may include a unit implemented in hardware, software, or firmware, and may interchangeably be used with other terms, In one embodiment, logic, logic block, part, or circuitry. A module may be a single integral component, or a minimum unit or part thereof, adapted to perform one or more functions. In one embodiment, according to an embodiment, the module may be implemented in a form of an application-specific integrated circuit (ASIC).

One or more embodiments as set forth herein may be implemented as software including one or more instructions that are stored in a storage medium that is readable by a machine. In one embodiment, a processor of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to one or more embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities. According to one or more embodiments, one or more of the above-described components may be omitted, or one or more other components may be added. Alternatively or additionally, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

According to one or more embodiments, in a non-volatile storage medium storing instructions, the instructions may be configured to, when executed by at least one processor, cause the at least one processor to perform at least one operation. The at least one operation may include displaying an application screen of a running application on a display, identifying a data input field included in the application screen, identifying a data type corresponding to the data input field, displaying at least one external electronic device, around the electronic device, capable of providing data corresponding to the identified data type, receiving data corresponding to the identified data type from an external electronic device selected from among the at least one external electronic device through a communication module, and entering the received data into the data input field.

The embodiments of the disclosure described in the present specification and the drawings are only presented as specific examples to easily explain the technical content according to the embodiments of the disclosure and help understanding of the embodiments of the disclosure, not intended to limit the scope of the embodiments of the disclosure. Therefore, the scope of one or more embodiments of the disclosure should be construed as encompassing all changes or modifications derived from the technical spirit of one or more embodiments of the disclosure in addition to the embodiments disclosed herein.

FIG. 1 illustrates an example of an environment (a system) 100 including a first electronic device 101, a second electronic device 102, and an audio source device (e.g., a smart phone) 103 in accordance with some embodiments of the disclosure.

In FIG. 1, the environment (the system) 100 may include the first electronic device 101, the second electronic device 102, and the audio source device 103. The audio source device 103 may include a mobile phone, a smart phone, a tablet PC, a music player, a Moving Picture Experts Group phase 1 or phase 2 (MPEG-1 or MPEG-2) audio layer 3 (MP3) player, a media player, a home theater, a wearable device, a laptop computer, a desktop personal computer (PC), a server, a personal digital assistant (PDA), a portable multimedia player (PMP), etc.

The first electronic device 101 and the second electronic device 102 may be audio devices including an earphone, an ear bud, a wireless speaker, a wireless headset, etc. In one embodiment, the first electronic device 101 may be the one side (e.g., left) ear bud among a pair of ear buds, and the second electronic device 102 may be the other side (e.g., right) ear bud.

In one embodiment, the first electronic device 101 and the second electronic device 102 may be wirelessly or wiredly coupled with each other. In one embodiment, the first electronic device 101 and the second electronic device 102 may form (e.g., Bluetooth (BT) pairing) a second wireless communication link 120. The first electronic device 101 and the second electronic device 102 may form a wired communication link 130 as well.

In one embodiment, the audio source device 103 may reproduce audio data on an audio source. The audio source device 103 may reproduce audio data stored in the audio source device 103 as well, and may receive audio data from an external electronic device (e.g., server), to reproduce the audio data in a streaming method as well. The audio source device 103 may output the reproduced audio data through the audio source device 103. The audio source device 103 may output the audio data through the first electronic device 101 or the second electronic device 102. The audio data may be outputted as an audio signal (or sound signal) corresponding to the audio data.

To output the audio data through the first electronic device 101 or the second electronic device 102, the audio source device 103 may be wirelessly coupled with the first electronic device 101 or the second electronic device 102. In one embodiment, the audio source device 103 may form (e.g., BT pairing) a first wireless communication link 110 with the first electronic device 101. The audio source device 103 may transmit the audio data reproduced in the audio source device 103, to the first electronic device 101 through the first wireless communication link 110. In one embodiment, the audio source device 103 may form a wireless communication link (not shown) with the second electronic device 102 in place of the first electronic device 101, and transmit the audio data to the second electronic device 102 through the formed wireless communication link as well.

In one embodiment, the first electronic device 101 (or the second electronic device 102) may receive audio data from the audio source device 103, to output an audio signal (or sound signal) corresponding to the audio data. In one embodiment, to receive the audio data from the audio source device 103, the first electronic device 101 may form (e.g., BT pairing) the first wireless communication link 110 with the audio source device 103. The first electronic device 101 may receive the audio data from the audio source device 103 through the first wireless communication link 110. The first electronic device 101 may output the received audio data, as an audio signal corresponding to the audio data.

In response to the first electronic device 101 forming the wired communication link 130 with the second electronic device 102, the first electronic device 101 may transmit at least a part of audio data received from the audio source device 103, to the second electronic device 102 through the wired communication link 130. In response to the first electronic device 101 forming the second wireless communication link 120 with the second electronic device 102, the first electronic device 101 may not transmit the audio data to the second electronic device 102.

The above-described operations of the first electronic device 101 may be denoted as a master operation. The master operation may include an operation of establishing a wireless communication link (e.g., the first wireless communication link 110) with the audio source device 103, and an operation of receiving audio data from the audio source device 103 through the wireless communication link, and, in response to a wired communication link (e.g., the wired communication link 130) being established with another electronic device (e.g., the second electronic device 102), transmitting at least a part of the audio data to another electronic device through the wired communication link. Also, the master operation may include an operation of acquiring information (or configuration information and hereinafter, referred to as a communication parameter) on the wireless communication link (e.g., the first wireless communication link 110) formed between the first electronic device 101 and the audio source device 103, and an operation of transmitting the communication parameter to another electronic device (e.g., the second electronic device 102).

The communication parameter may be information for establishing the first wireless communication link 110 between the first electronic device 101 and the audio source device 103. The communication parameter may be used for accessing (or observing) the first wireless communication link 110 by another electronic device (e.g., the second electronic device 102). The communication parameter may be used for, by accessing (or observing) the first wireless communication link 110 by another electronic device (e.g., the second electronic device 102), acquiring information transmitted and/or received through the first wireless communication link 110. The communication parameter may be used for sniffing, by another electronic device (e.g., the second electronic device 102), information (e.g., the audio data transmitted from the audio source device 103 to the first electronic device 101) transmitted and/or received through the first wireless communication link 110. In one embodiment, in response to the first wireless communication link 110 being formed according to a Bluetooth protocol, the communication parameter may include Bluetooth device address (BD_ADDR), logical transport address (LT_ADDR), a native clock (CLKN) of a source (SRC) (e.g., the audio source device 103), a clock offset between the SRC and a sink (SNK) (e.g., the first electronic device 101), and/or an encryption parameter (e.g., key exchange) on a link between the SRC and the SNK.

In response to the first electronic device 101 receiving audio data from the audio source device 103 through the first wireless communication link 110 formed with the audio source device 103 (i.e., in response to performing a master operation), the second electronic device 102 may perform the following operations (i.e., slave operation).

In one embodiment, in response to the second electronic device 102 forming the wired communication link 130 with the first electronic device 101, the second electronic device 102 may receive at least a part of audio data that the first electronic device 101 has received from the audio source device 103, from the first electronic device 101 through the wired communication link 130. The second electronic device 102 may output the received at least partial audio data, as an audio signal.

In one embodiment, in response to the second electronic device 102 forming the second wireless communication link 120 with the first electronic device 101, the second electronic device 102 may not receive audio data from the first electronic device 101. The second electronic device 102 may acquire audio data that the first electronic device 101 receives from the audio source device 103, from the first wireless communication link 110 by using the communication parameter. The operation of acquiring, by the second electronic device 102, the audio data from the first wireless communication link 110 by using the communication parameter may include sniffing (or snooping). The sniffing or snooping may represent an operation in which, by using the communication parameter that is information on the wireless communication link (e.g., the first wireless communication link 110) between other electronic devices, an electronic device (e.g., the second electronic device 102) accesses a wireless communication link (e.g., the first wireless communication link 110), to acquire information transmitted and/or received through the wireless communication link (e.g., the first wireless communication link 110). The second electronic device 102 may output at least a part of the acquired (or sniffed) audio data, as an audio signal. Meantime, the second wireless communication link 120 formed between the second electronic device 102 and the first electronic device 101 may be used for receiving, by the second electronic device 102, information for acquisition (or sniffing) or supplementary information on audio data.

In one embodiment, the first wireless communication link 110 or the second wireless communication link 120 may be formed according to at least a part of a Bluetooth protocol. In other some embodiments, the first wireless communication link 110 or the second wireless communication link 120 may be formed according to a non-standard Bluetooth protocol or non-Bluetooth protocol. In one embodiment, other protocols different from the Bluetooth protocol may be used such as Wi-Fi (e.g., IEEE 802.11) and/or peer to peer (P2P) (e.g., ad-hoc, Wi-Fi direct, direct link setup (DLS), etc.) schemes, etc.

Figure 2:
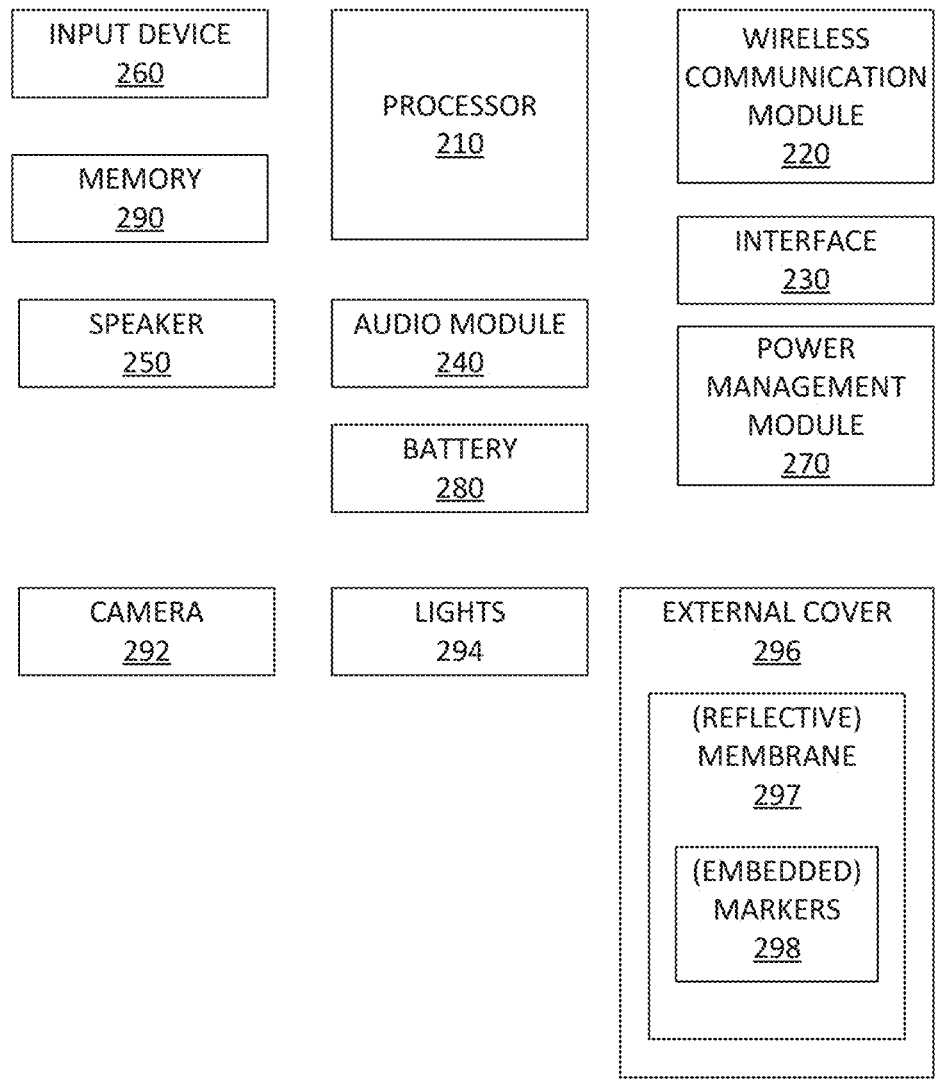
FIG. 2 illustrates components of the electronic device in accordance with some embodiments of the disclosure.

FIG. 2 illustrates components of an electronic device 200 in accordance with some embodiments of the disclosure.

The electronic device 200 may correspond to the first electronic device 101 (e.g., left (or right) ear bud) or the second electronic device 102 (e.g., right (or left) ear bud).

In FIG. 2, the electronic device 200 may include a processor 210, a wireless communication module 220, an interface 230, an audio module 240, a speaker 250, an input device 260, a power management module 270, a battery 280, and/or a memory 290. The electronic device 200 may further include a camera 292, a plurality of lights 294 (e.g., Light Emitting Diodes (LEDs)), and/or an external cover 296. In one embodiment, the external cover 296 may include a membrane 297, which may be reflective, and the membrane 297 may include a set of markers 298, which may be embedded in the membrane 297.

The processor 210 may control a general operation of the electronic device 200. The processor 210 may receive commands of other elements (e.g., the wireless communication module 220, the input device 260, the audio module 240, the power management module 270, the memory 290, or the interface 230), and may interpret the received commands, and may perform computation or process data according to the interpreted commands. The processor 210 may be implemented as software as well, and may be implemented as hardware such as a chip, a circuitry, etc. as well, and may be implemented as a set of software and hardware as well. The processor 210 may be one in number as well, or may be a set of a plurality of processors as well.

The processor 210 may control the wireless communication module 220 to establish (e.g., BT pairing), by the electronic device 200 (e.g., the first electronic device 101), the first wireless communication link 110 with the audio source device 103. The first wireless communication link 110 may be a link in which two-way communication is possible. In one embodiment, the processor 210 may receive audio data from the audio source device 103, and transmit, to the audio source device 103, a response (e.g., acknowledgement (ACK) or negative acknowledgement (NACK)) representing whether it has successfully received the audio data.

In response to an operation of identifying (or detecting) that the electronic device 200 (e.g., the first electronic device 101) establishes the first wireless communication link 110 with the audio source device 103, the processor 210 may obtain audio data received from the audio source device 103 through the first wireless communication link 110, by using the wireless communication module 220. In one embodiment, in response to audio data on an audio source being reproduced in the audio source device 103, the audio data may be received to the electronic device 200 (e.g., the first electronic device 101) through the first wireless communication link 110. The received audio data may be the form of a digital audio signal.

The processor 210 may control the audio module 240 to convert (e.g., decode) the received digital audio signal into an analog audio signal. The processor 210 may control the audio module 240 to output at least a part of the converted analog audio signal through the speaker 250. In one embodiment, the received audio data may be stereo data including data on a left (L) channel and data on a right (R) channel. The processor 210 may control the audio module 240 to output an audio signal on one channel (e.g., left) or all both channels (e.g., left and right) among the converted analog audio signal, through the speaker 250 of the electronic device 200, according to configuration information of the electronic device 200.

The processor 210 may identify whether the electronic device 200 (e.g., the first electronic device 101) is wiredly coupled with another electronic device (e.g., the second electronic device 102) by using the interface 230. In response to identifying that the electronic device 200 (e.g., the first electronic device 101) is coupled with another electronic device (e.g., the second electronic device 102) through the interface 230 by the wired communication link 130, the processor 210 may transmit at least a part of audio data received from the audio source device 103, to another electronic device (e.g., the second electronic device 102) through the wired communication link 130.

The processor 210 may transmit audio data on one channel (e.g., left) or audio data on all both channels (e.g., left and right) among the audio data, to another electronic device (e.g., the second electronic device 102) through the wired communication link 130 formed through the interface 230. The processor 210 may transmit audio data before or after conversion (i.e., decoding), to another electronic device (e.g., the second electronic device 102) through the wired communication link 130 formed through the interface 230.

In response to an operation of identifying the establishment of the first wireless communication link 110 between the electronic device 200 (e.g., the first electronic device 101) and the audio source device 103, the processor 210 may acquire (or identify) a communication parameter that is information on the first wireless communication link 110. The processor 210 may control the memory 290 to store the acquired communication parameter. The processor 210 may transmit the communication parameter to another electronic device (e.g., the second electronic device 102) through various paths (e.g., the wired communication link 130 or the second wireless communication link 120).

The processor 210 may transmit a mode parameter as well as the communication parameter, to another electronic device (e.g., the second electronic device 102) through various paths. The mode parameter may include information on a sound effect or audio filter which is applied to audio data in response to the electronic device 200 outputting the received audio data through the speaker 250. The mode parameter may include information (e.g., volume configuration information and/or output loudness) on an output intensity or strength which is applied in response to the electronic device 200 outputting the received audio data. The mode parameter may include information on setting of an application that is executed to reproduce music in the audio source device 103. The mode parameter may include information on a left (L) channel of audio data and information on a right (R) channel of the audio data. The mode parameter may be used to output, by the first electronic device 101 and the second electronic device 102, audio data to which the same or similar effect (or processing) has been applied. The mode parameter may be used to output, by the first electronic device 101 and the second electronic device 102, the audio data to which the same or similar effect (or processing) has been applied, even in response to the wired communication link 130 between the first electronic device 101 and the second electronic device 102 being disconnected. The mode parameter may be used to output, by the electronic device 200, the audio data to which the same or similar effect (or processing) has been applied, in response to the wired communication link 130 being established and in response to being interrupted. In one embodiment, the mode parameter may be previously stored in the memory 290 of the electronic device 200 (e.g., the first electronic device 101). In one embodiment, the mode parameter may be received to the electronic device 200 (e.g., the first electronic device 101) through the first wireless communication link 110 from the audio source device 103. The processor 210 may control the memory 290 to store the received mode parameter.

The processor 210 may transmit the communication parameter to another electronic device (e.g., the second electronic device 102), and may additionally transmit even the mode parameter to another electronic device (e.g., the second electronic device 102). The communication parameter and the mode parameter may be simultaneously transmitted as one packet from the first electronic device 101 to the second electronic device 102 as well, and may be generally simultaneously transmitted as well, and may be mutually independently transmitted as well. The communication parameter or the mode parameter may be transmitted periodically (or cyclically) or non-periodically (non-cyclically).

In one embodiment, the processor 210 may transmit the communication parameter (or additionally the mode parameter) to another electronic device (e.g., the second electronic device 102) through the wired communication link 130 by using the interface 230. In one embodiment, in response to identifying that the electronic device 200 (e.g., the first electronic device 101) is coupled with another electronic device (e.g., the second electronic device 102) through the wired communication link 130, in response to identifying that the first wireless communication link 110 is established, the processor 210 may transmit the communication parameter or the mode parameter to another electronic device (e.g., the second electronic device 102) through the wired communication link 130.

In one embodiment, in response to an operation of identifying that the electronic device 200 (e.g., the first electronic device 101) is coupled with another electronic device (e.g., the second electronic device 102) through the wired communication link 130, the processor 210 may periodically or non-periodically transmit the communication parameter or the mode parameter to another electronic device (e.g., the second electronic device 102) through the wired communication link 130. The communication parameter may further include information for establishing the second wireless communication link 120 (e.g., BT pairing) between the electronic device 200 (e.g., the first electronic device 101) and another electronic device (e.g., the second electronic device 102). In one embodiment, the communication parameter may further include identification information (ID) and address information of the electronic device 200 (e.g., the first electronic device 101).

In one embodiment, by using the wireless communication module 220, the processor 210 may transmit the communication parameter (or additionally the mode parameter) to another electronic device (e.g., the second electronic device 102) through the second wireless communication link 120. In one embodiment, in response to identifying that the wired communication link 130 is disconnected, the processor 210 may establish the second wireless communication link 120 with another electronic device (e.g., the second electronic device 102) by using the wireless communication module 220. In response to an operation of identifying that the second wireless communication link 120 is established, the processor 210 may transmit the communication parameter or the mode parameter to another electronic device (e.g., the second electronic device 102) through the second wireless communication link 120.

The processor 210 may identify whether the wired communication link 130 formed with another electronic device (e.g., the second electronic device 102) through the interface 230 is interrupted. The interruption of the wired communication link 130 may mean that the wired communication link (e.g., a cable) 130 is disconnected. In response to identifying that the wired communication link 130 with another electronic device (e.g., the second electronic device 102) is interrupted, the processor 210 may control the wireless communication module 220 to establish (e.g., BT pairing) the second wireless communication link 120 with another electronic device (e.g., the second electronic device 102). In some embodiments, in response to identifying that the second wireless communication link 120 is established (e.g., BT pairing), the processor 210 may transmit the communication parameter to another electronic device (e.g., the second electronic device 102) through the second wireless communication link 120, and may additionally transmit the mode parameter as well.

If the electronic device 200 is the second electronic device 102 performing a slave operation, the processor 210 may perform the following operations as well.

In response to an operation of establishing the wired communication link 130 with another electronic device (e.g., the first electronic device 101), the processor 210 may receive audio data from another electronic device (e.g., the first electronic device 101) through the wired communication link 130 by using the interface 230. The received audio data may be at least a part (e.g., data on a right channel) of audio data that another electronic device (e.g., the first electronic device 101) has received from the audio source device 103.

The processor 210 may control the audio module 240 to output audio data received through the wired communication link 130. In one embodiment, the processor 210 may receive, through the interface 230, an analog audio signal that is converted (i.e., decoded) through an audio module of another electronic device (e.g., the first electronic device 101), and output the received analog audio signal through the speaker 250. In one embodiment, the processor 210 may control the audio module 240 to receive a digital audio signal not converted (i.e., decoded), from another electronic device (e.g., the first electronic device 101) through the interface 230, and convert (i.e., decode) the received digital audio signal into an analog audio signal. The processor 210 may output the converted analog audio signal through the speaker 250.

The processor 210 may receive the communication parameter from another electronic device (e.g., the first electronic device 101), and may additionally receive the mode parameter. Or, at least a part of the mode parameter may be previously stored in the memory 290 as well. In some embodiments, the processor 210 may receive the communication parameter (or additionally the mode parameter) from another electronic device (e.g., the first electronic device 101) through the wired communication link 130. In one embodiment, the processor 210 may establish the second wireless communication link 120 with another electronic device (e.g., the first electronic device 101), based at least on identifying that the wired communication link 130 is disconnected, by using ID and address information of another electronic device (e.g., the first electronic device 101) included in the received communication parameter.

In one embodiment, in response to an operation of identifying that the wired communication link 130 is disconnected, the processor 210 may control the wireless communication module 220 to establish the second wireless communication link 120 with another electronic device (e.g., the first electronic device 101). In response to an operation of identifying that the second wireless communication link 120 is established, the processor 210 may receive the communication parameter (or additionally the mode parameter) from another electronic device (e.g., the first electronic device 101) through the second wireless communication link 120. The processor 210 may control the memory 290 to store the communication parameter or mode parameter received from another electronic device (e.g., the first electronic device 101).

In response to an operation of identifying that the wired communication link 130 is disconnected, the processor 210 may control the wireless communication module 220 to receive audio data that the audio source device 103 transmits to another electronic device (e.g., the first electronic device 101), by using the communication parameter. The processor 210 may control the wireless communication module 220 to receive or acquire audio data from the audio source device 103 or the first wireless communication link 110, by using the communication parameter. In one embodiment, the processor 210 may control the wireless communication module 220 to access (or observe) the first wireless communication link 110 by using the communication parameter. The processor 210 may control the wireless communication module 220 to acquire audio data that the audio source device 103 transmits to another electronic device (e.g., the first electronic device 101), from the first wireless communication link 110, by using the communication parameter. In one embodiment, the operation of receiving (or acquiring) the audio data from the audio source device 103 (or the first wireless communication link 110) through the wireless communication module 220 by using the communication parameter may include sniffing.

The processor 210 may control the audio module 240 to output audio data received from the audio source device 103 or acquired from the first wireless communication link 110. In one embodiment, the processor 210 may control the audio module 240 to convert (e.g., decode) the received audio data into an analog audio signal. The processor 210 may control the audio module 240 to output one channel (e.g., right) or all both channels (e.g., left and right) among the converted audio signal through the speaker 250, according to configuration information of the electronic device 200 (e.g., the second electronic device 102). The electronic device 200 (e.g., the second electronic device 102) may output the acquired audio data generally at the same time as another electronic device (e.g., the first electronic device 101) outputs audio data. The processor 210 may apply the same sound effect as another electronic device (e.g., the first electronic device 101) to the acquired audio data by using the mode parameter, to output the resultant audio data.

The processor 210 may control the wireless communication module 220 to transmit a response (e.g., ACK or NACK) representing whether it has successfully received audio data, to another electronic device (e.g., the first electronic device 101) through the second wireless communication link 120.

The wireless communication module 220 may establish a wireless communication link between the electronic device 200 and external electronic devices (e.g., the audio source device 103, the first electronic device 101 or the second electronic device 102), and may perform communication through the established communication link.

In one embodiment, in response to an operation of the electronic device 200 being the first electronic device 101, the wireless communication module 220 may establish the first wireless communication link 110 with the audio source device 103, and may establish the second wireless communication link 120 with the second electronic device 102. The wireless communication module 220 may receive audio data from the audio source device 103 through the first wireless communication link 110, and may transmit a response (e.g., ACK or NACK) representing whether it has normally received the audio data, to the audio source device 103. The wireless communication module 220 may transmit the communication parameter or mode parameter to the second electronic device 102 through the second wireless communication link 120, and may receive a response (e.g., ACK or NACK) representing whether the second electronic device 102 has normally received audio data, from the second electronic device 102.

In one embodiment, in response to an operation of the electronic device 200 being the second electronic device 102, the wireless communication module 220 may establish the second wireless communication link 120 with the first electronic device 101. The wireless communication module 220 may receive the communication parameter or mode parameter from the first electronic device 101 through the second wireless communication link 120, and may transmit a response (e.g., ACK or NACK) representing whether it has normally received audio data, to the first electronic device 101. The wireless communication module 220 may access the first wireless communication link 110 by using the communication parameter, thereby receiving (or acquiring) audio data that the audio source device 103 transmits to the first electronic device 101 through the first wireless communication link 110.

The interface 230 may support a designated protocol capable of wiredly coupling with an external electronic device (e.g., the first electronic device 101 or the second electronic device 102). The interface 230 may be wiredly coupled with an interface of another electronic device through a cable. In one embodiment, the interface of the first electronic device 101 may be coupled with the interface of the second electronic device 102 through the cable, thereby forming the wired communication link 130 (e.g., serial communication) with the second electronic device 102. In some embodiments, in response to the wired communication link 130 being established between the first electronic device 101 and the second electronic device 102, the interface of the first electronic device 101 may be used to transmit audio data, and the interface of the second electronic device 102 may be used to receive the audio data.

The audio module 240 may process a signal related to a sound. The audio module 240 may acquire a sound signal (e.g., a user's voice signal) through the input device 260 (e.g., a microphone). By using an electro-acoustic transducer, the audio module 240 may convert the acquired sound signal into an analog audio signal (or electrical signal) corresponding to the sound signal. The audio module 240 may convert the analog audio signal into a digital audio signal through a converter (e.g., an analog-to-digital converter (ADC)). By using a codec, the audio module 240 may encode or compress the analog audio signal into a digital audio signal. The audio module 240 may transmit the digital audio signal to other constituent elements (e.g., the processor 210, the wireless communication module 220, the interface 230, the memory 290, etc.) of the electronic device 200.

The audio module 240 may receive a digital audio signal from the other constituent elements (e.g., the processor 210, the wireless communication module 220, the interface 230, the memory 290, etc.) of the electronic device 200. The audio module 240 may convert the digital audio signal into an analog audio signal through a converter (e.g., a digital-to-analog converter (DAC)). In one embodiment, by using a codec, the audio module 240 may decode or decompress the digital audio signal into the analog audio signal. By using an electro-acoustic transducer, the audio module 240 may convert the analog audio signal (or electrical signal) into a sound signal corresponding to the analog audio signal. The audio module 240 may output a sound signal through an output device (e.g., speaker 250). The audio module 240 may output a bone conduction signal through the output device as well.

The audio module 240 may be implemented as a set of software (e.g., a codec) and hardware (e.g., a codec, an ADC, a DAC, an electro-acoustic transducer, etc.). In one embodiment, the codec may be the form of software as well, and may be the form of hardware as well. At least a part (e.g., codec) of the audio module 240 may be included in the processor 210.

In one embodiment, in response to the electronic device 200 being the first electronic device 101, the audio module 240 may decode audio data received from the audio source device 103 through the first wireless communication link 110, to output the decoded audio data through the speaker 250. In one embodiment, the audio module 240 may output, through the speaker 250, audio data on one channel (e.g., left channel) among the received audio data, according to configuration information of the first electronic device 101. In response to the electronic device 200 (e.g., the first electronic device 101) being coupled with another electronic device (e.g., the second electronic device 102) through the wired communication link 130, the audio module 240 may transmit, through the interface 230, at least a part of audio data which is received from the audio source device 103 through the first wireless communication link 110. In one embodiment, the audio module 240 may transmit audio data on one channel among the received audio data, to another electronic device (e.g., the second electronic device 102 through the interface 230. In one embodiment, the audio module 240 may transmit data on all both channels (e.g., left and right channels) among the received audio data, to another electronic device (e.g., the second electronic device 102) through the interface 230. The audio data transmitted to another electronic device (e.g., the second electronic device 102) may be audio data decoded in the electronic device 200 (e.g., the first electronic device 101) as well, and may be the original audio data before decoding as well.

In one embodiment, in response to the electronic device 200 being the second electronic device 102, the audio module 240 may output, through the speaker 250, audio data received from another electronic device (e.g., the first electronic device 101) through the wired communication link 110. In one embodiment, in response to audio data decoded in another electronic device (e.g., the first electronic device 101) being received through the interface 230, the audio module 240 may receive the audio data from the interface 230, to output the received audio data through the speaker 250. In one embodiment, in response to audio data before being decoded in another electronic device (e.g., the first electronic device 101) being received through the interface 230, the audio data may be decoded in the electronic device 200 (e.g., the second electronic device 102). The audio module 240 may decode the audio data and thereafter, output the decoded audio data through the speaker 250. In response to receiving audio data on one channel (e.g., right channel) from another electronic device (e.g., the first electronic device 101), the audio module 240 may output the audio data on the one channel (e.g., right channel). In response to receiving audio data on all both channels (e.g., left and right channels) from another electronic device (e.g., the first electronic device 101), the audio module 240 may output the audio data on the one channel (e.g., right channel) or the audio data on the all both channels, according to configuration information of the electronic device 200 (e.g., the second electronic device 102).

Before outputting audio data, the audio module 240 of the electronic device 200 (e.g., the first electronic device 101 and the second electronic device 102) may perform various processing for the audio data, based at least on a previously stored mode parameter. In one embodiment, the audio module 240 may perform sampling rate change for one or more digital audio signals, applying of one or more filters, interpolation processing, amplification or attenuation (e.g., amplification or attenuation of a partial frequency band or whole frequency band) processing, noise processing (e.g., noise or echo attenuation), channel change (e.g., conversion between mono and stereo), mixing, or designated signal extraction. In one embodiment, by using the mode parameter, the first electronic device 101 and the second electronic device 102 may output audio data to which the same sound effect or audio filter is applied.

In one or more embodiments, in response to the electronic device 200 being the second electronic device 102, the audio module 240 may perform processing for audio data output identically in response to the wired communication link 130 being established and in response to being interrupted, based on a mode parameter received from the first electronic device 101 or previously stored in the memory 290. In one embodiment, in response to being coupled with the first electronic device 101 by the wired communication link 130, the second electronic device 102 may operate in a first mode state of outputting audio data received through the wired communication link 130 by using the audio module 240 (or the speaker 250). In response to not being coupled with the first electronic device 101 by the wired communication link 130, the second electronic device 102 may operate in a second mode state of outputting audio data received through the first wireless communication link 110 by using the audio module 240 (or the speaker 250). The second electronic device 102 may apply the same or similar audio output effect (e.g., a sound effect, a volume, an audio filter, etc.) in the first mode state and the second mode state.

The input device 260 may receive an instruction or data from a user. The input device 260 may be used to adjust a volume of an audio signal outputted through the electronic device 200 (e.g., the first electronic device 101 or the second electronic device 102), or reproduce next music. In one embodiment, the input device 260 may include a touch panel. The input device 260 may sense a touch or hovering input of the finger and a pen. In one embodiment, the input device 260 may include a physical key or a hard key. The input device 260 may provide the received input and data related with the received input, to the processor 210.

The power management module 270 may manage power supplied to the electronic device 200 (e.g., the first electronic device 101 or the second electronic device 102). In one embodiment, the power management module 270 may be configured as at least a part of a power management integrated circuitry (PMIC).

The power management module 270 may measure a level of the battery 280 of the electronic device 200. The power management module 270 may provide the processor 210 with information on the level of the battery 280 of the electronic device 200. The information on the level of the battery 280 of the electronic device 200 may be transmitted to the audio source device 103. The information on the level of the battery 280 of the electronic device 200 may be used to identify whether the electronic device 200 will perform a master operation. In one embodiment, in response to the level of the battery 280 of the electronic device 200 (e.g., the first electronic device 101) performing the master operation being less by a designated amount than a level of a battery of another electronic device (e.g., the second electronic device 102) performing a slave operation, the electronic device 200 may perform the slave operation and another electronic device may perform the master operation. Likewise, in response to the level of the battery 280 of the electronic device 200 (e.g., the second electronic device 102) performing the slave operation being equal to or is more by a designated amount than the level of the battery of another electronic device (e.g., the second electronic device 102) performing the master operation, the electronic device 200 may perform the master operation and another electronic device may perform the slave operation.

The battery 280 may supply power to at least one constituent element of the electronic device 200. In response to the electronic device 200 being mounted (or coupled) on a designated charging device, the battery 280 may be charged. In one embodiment, in response to the cable being mounted on a connector hole, the battery 280 may be charged through the interface 230. In response to the interface 230 of the electronic device 200 being connected with the interface of the cable through the connector hole, the battery 280 may be charged.

Figure 3:
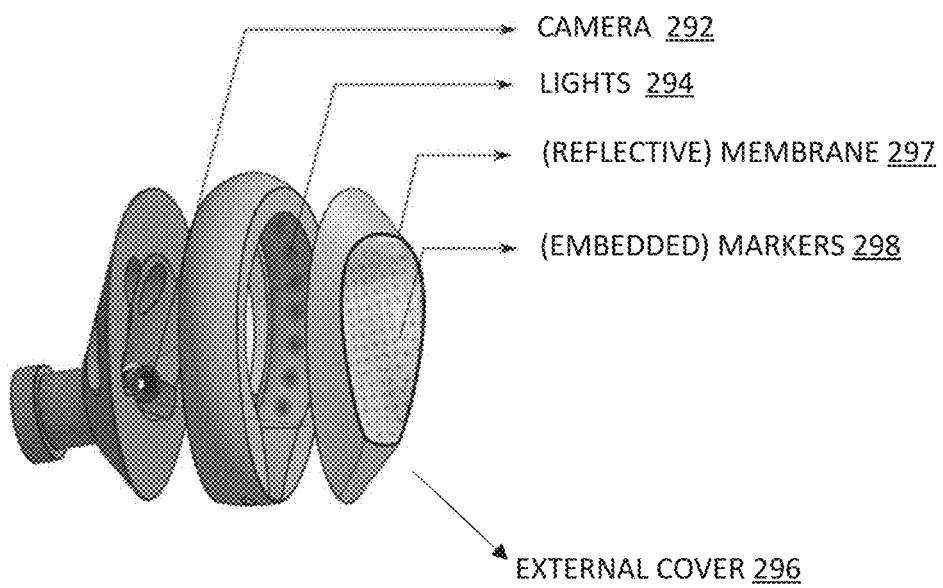
FIG. 3 illustrates an example of the electronic device in accordance with some embodiments of the disclosure.

FIG. 3 illustrates an example of the electronic device 200 in accordance with some embodiments of the disclosure. As shown, the electronic device 200 includes the camera 292, the plurality of lights 294, and the external cover 296 that includes the (reflective) membrane 297 and the set of markers 298 (embedded in the membrane 297). When a finger of a user is pressed on the external cover 296, the camera 292 captures a deformation of the set of markers 298 on the membrane 297 and generates an image about the deformation, when the plurality of lights 294 are turned on.

Figure 4:
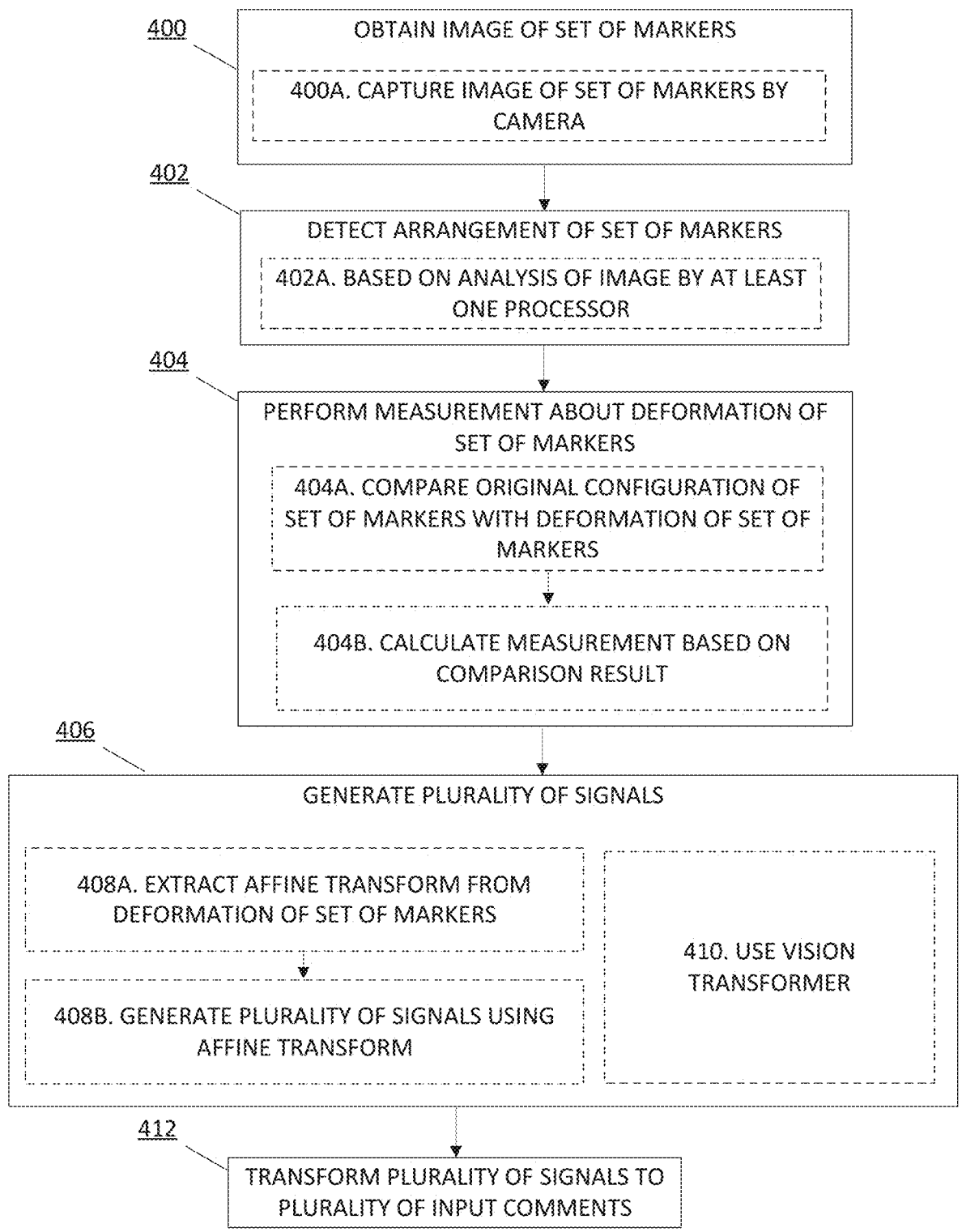
FIG. 4 illustrates operations performed by the electronic device in accordance with some embodiments of the disclosure.

FIG. 4 illustrates operations performed by the electronic device 200 in accordance with some embodiments of the disclosure.

At operation 400, the electronic device 200 obtains an image of the set of markers 298. In one embodiment, at operation 400A, the electronic device 200 captures the image of the set of markers 298 by the camera 292. In one embodiment, the image of the set of markers shows a deformation of the set of markers 298 that is caused by the user's finger pressure on the external cover 296 that includes the (reflective) membrane 297 and the set of markers 298 (embedded in the membrane 297).

At operation 402, the electronic device 200 detects an arrangement of the set of markers 298. The arrangement may correspond to the deformation of the set of markers 298. In one embodiment, at operation 402A, the arrangement of the set of markers may be detected based on an analysis of the image by the processor 210 of the electronic device 200.

At operation 404, based on the arrangement of the set of markers 298, the electronic device 200 performs a measurement about the deformation of the set of markers. In one embodiment, at operation 404A, the electronic device 200 compares an original configuration of the set of markers 298 with the deformation of the set of markers 298 and generating a comparison result. At operation 404B, the electronic device 200 calculates the measurement based on the comparison result between the original configuration of the set of markers 298 and the deformation of the set of markers 298.

At operation 406, based on the measurement about the deformation of the set of markers 298, the electronic device 200 generates a plurality of signals. In one embodiment, at operation 408A, the electronic device 200 extracts an affine transform from the deformation of the set of markers 298 and, at operation 408B, the electronic device 200 generates the plurality of signals using the affine transform. In one embodiment, at operation 410, the electronic device 200 generates the plurality of signals using a vision transformer. In one embodiment, the plurality of signals include or correspond to a first coordinate (X) displacement, a second coordinate (Y) displacement, and an angle (Θ) displacement.

At operation 412, the electronic device 200 transforms the plurality of signals to a plurality of input commands that are used to control the electronic device 200. For example, when the plurality of signals include (X, Y, Θ) that are equal to (1, 1, 45 degrees), the electronic device 200 may transform the plurality of signals to a 'volume control' command that is used to control an audio volume of the electronic device 200.

Figure 5:
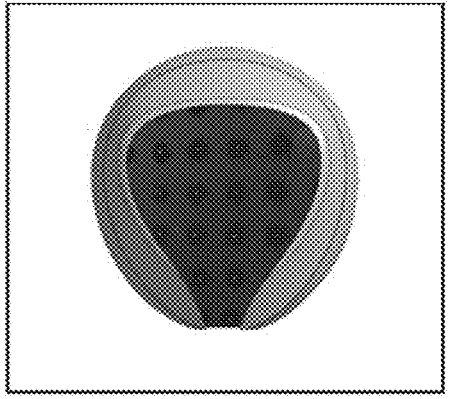
FIG. 5 illustrates an original configuration of a set of markers and a deformation of the set of markers.
Figure 5:
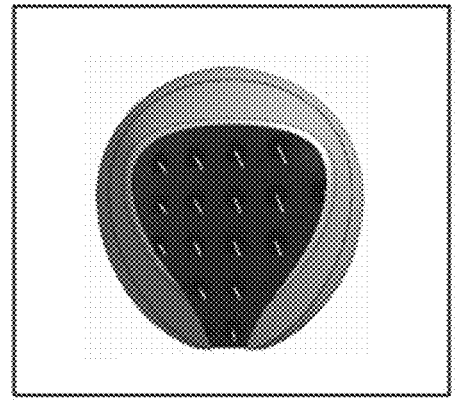

FIG. 5 illustrates an original configuration of the set of markers 298 and a deformation of the set of markers 298. In one embodiment, the processor 210 is connected to the camera 292, thus receives the image about the deformation of the set of markers 298 and saves the image in the memory 290. When the memory 290 stores the original configuration of the set of markers 298, the processor 210 may compare the deformation of the set of markers 298, which is recorded in the image, with the original configuration of the set of markers 298. Based on the comparison between the deformation of the set of markers 298 and the original configuration of the set of markers 298, the processor 210 may generate a plurality of signals that would correspond to input commands of the electronic device 200.

FIG. 6 shows an affine transform extracted from the deformation of the set of markers 298 and the plurality of signals (a first coordinate (X) displacement, a second coordinate (Y) displacement, and an angle (Θ) displacement) generated using the affine transform, in accordance with some embodiments of the disclosure. In the matrix T of FIG. 6, the parameters a, b, c, d, e, and f represent the components of the matrix T, which are used to calculate the angle (Θ).

Figure 7:
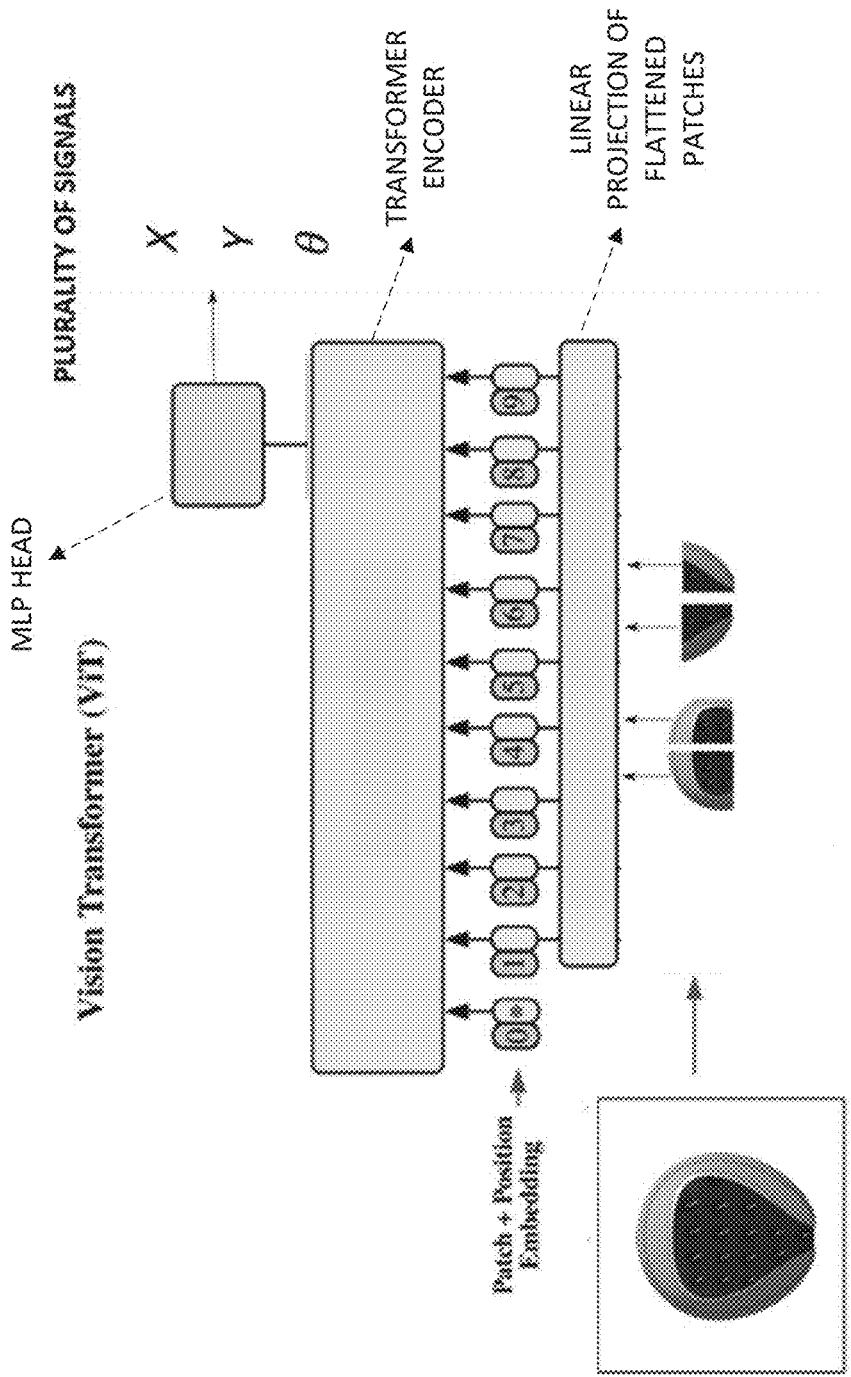
FIG. 7 shows a vision transformer to be used to generate the plurality of signals in accordance with some embodiments of the disclosure.

FIG. 7 shows a vision transformer to be used to generate the plurality of signals in accordance with some embodiments of the disclosure. In one embodiment, the measurement about the deformation of the set of markers may correspond to sub-images (or patches) of the set of markers 298. The sub-images are encoded with the vision transformer to generate the plurality of signals, such as the first coordinate (X) displacement, the second coordinate (Y) displacement, and the angle (Θ) displacement.

The vision transformer (ViT) is a type of neural network that may be used for image classification and other computer vision tasks. The vision transformer is configured to split the input image into a grid of patches. Then, each patch is flattened into a vector, and the resulting sequence of vectors is fed into the transformer encoder. This procedure allows the vision transformer to learn long-range dependencies in images.

The vision transformer uses a self-attention mechanism to learn relationships between the different patches in an image. The self-attention mechanism allows the vision transformer to learn global features of images, such as the overall composition and layout. The output of the transformer encoder of the vision transformer is a sequence of vectors, each of which represents a different feature of the image. The output sequence of vectors is then fed into a classification head to predict the class of the image. That is, the output sequence of vectors from the 'Transformer Encoder' in FIG. 7 is fed into the "MLP head" (a classification head) that predicts and outputs the plurality of signals: the first coordinate (X) displacement, the second coordinate (Y) displacement, and the angle (Θ) displacement.

Figure 8A:
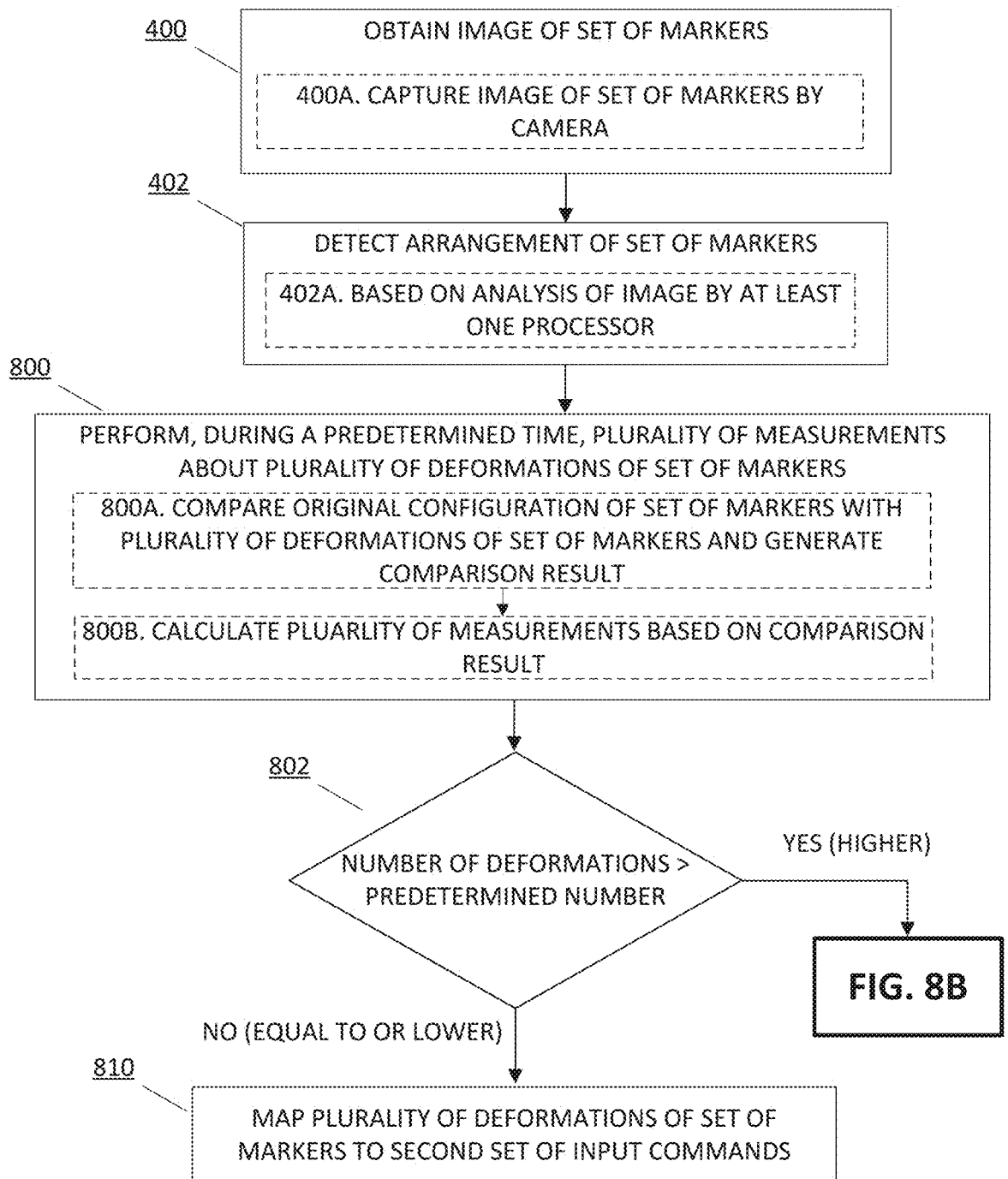
FIGS. 8A and 8B illustrate operations by the electronic device in accordance with some embodiments of the disclosure.
Figure 8B:
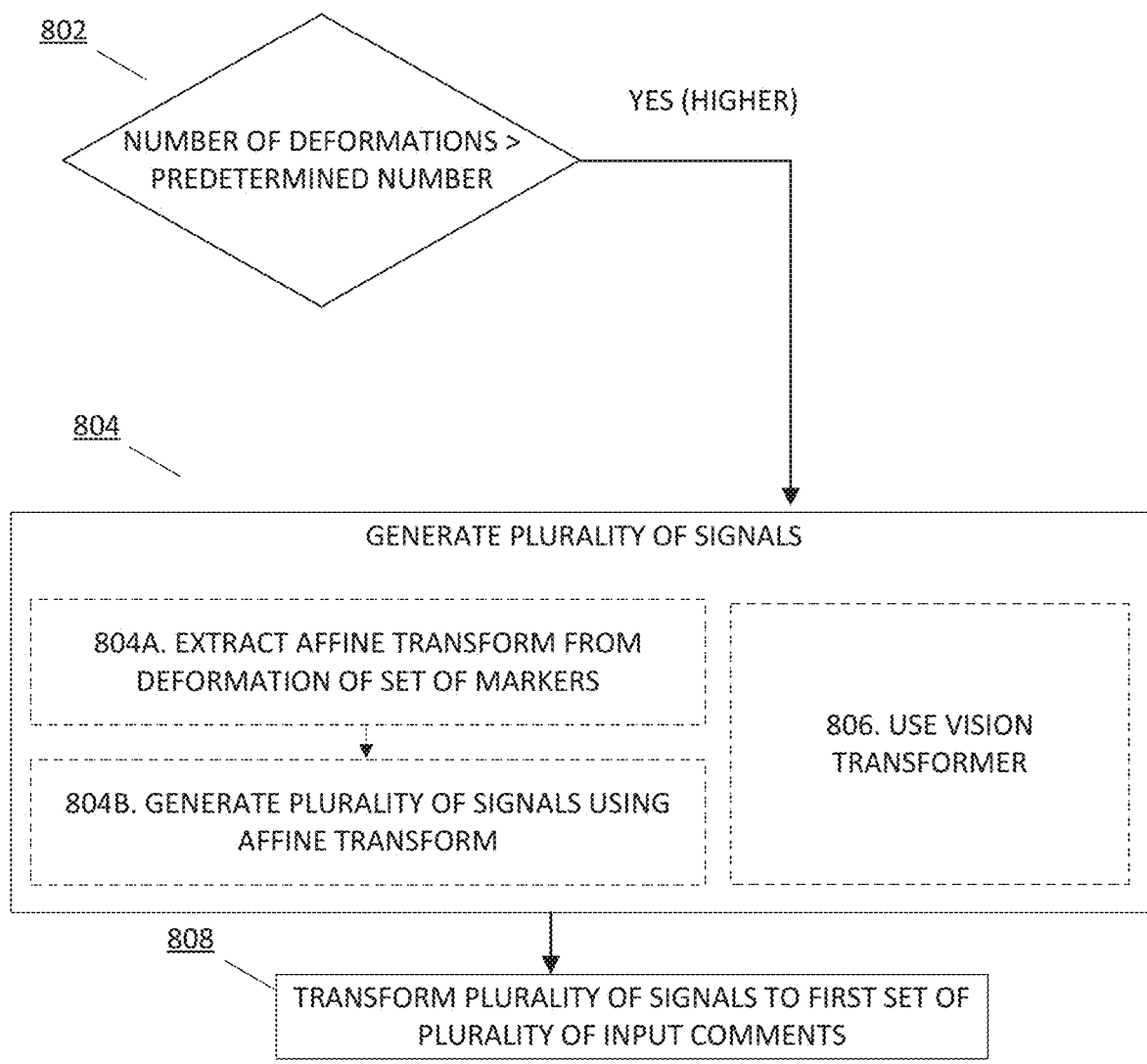

FIGS. 8A and 8B illustrate operations by the electronic device in accordance with some embodiments of the disclosure. In FIG. 8A, the electronic device 200 performs operations 400 and 402 that are described above with respect to FIG. 4. Optionally, the electronic device 200 may perform operation 400A or operation 402B, which is also described above with respect to FIG. 4.

At operation 800, based on the arrangement of the set of markers, the electronic device 200 performs, during a predetermined time, a plurality of measurements about a plurality of deformations of the set of markers 298. For example, the predetermined time is 0.2 or 0.5 milliseconds. In one embodiment, at operation 800A, the electronic device 200 may compare an original configuration of the set of markers 298 with the plurality of deformations of the set of markers 298 and generate a comparison result. At operation 800B, the electronic device 200 may calculate the plurality of measurements based on the comparison result between the original configuration of the set of markers 298 and the plurality of deformations of the set of markers 298.

At operation 802, the electronic device 200 determines whether a number of the deformations of the set of markers 298 is higher than a predetermined number. For example, the predetermined number is three (3).

Figure 9:
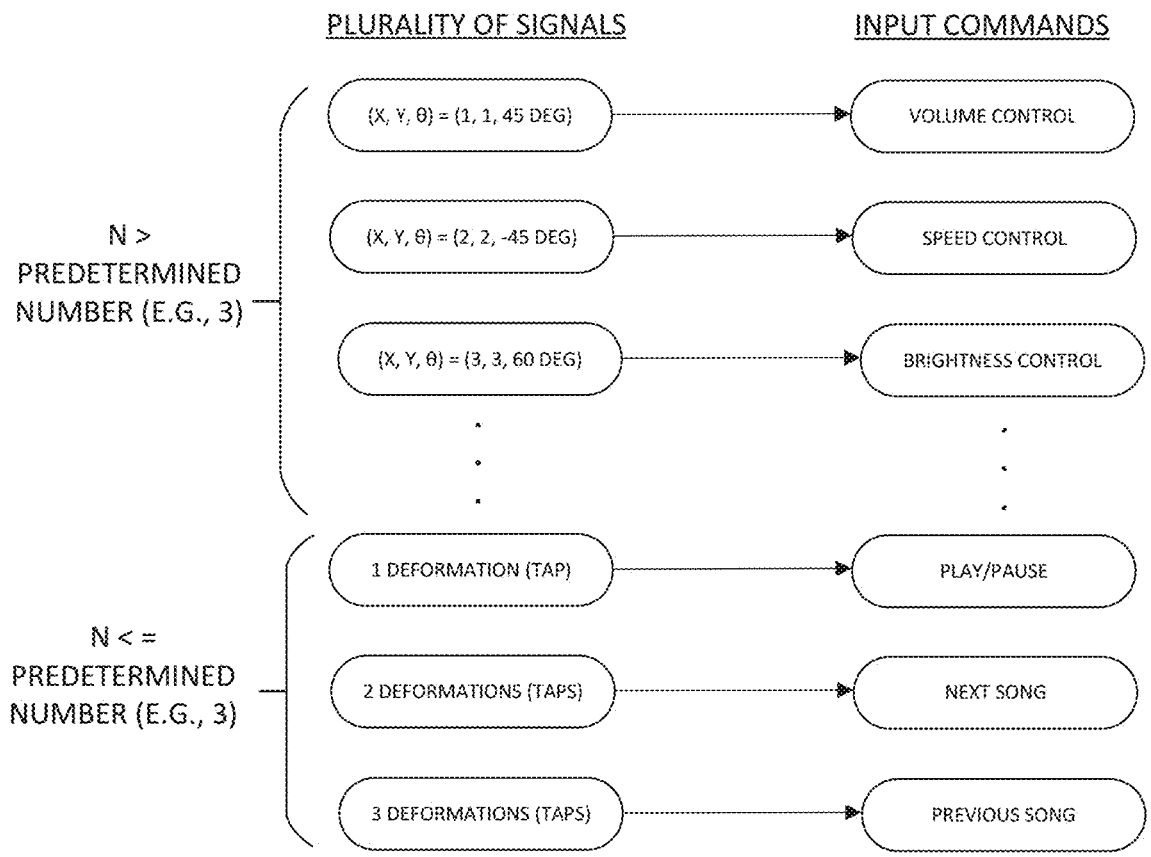
FIG. 9 illustrates a mapping between the plurality of signals and input commands of the electronic device, in accordance with some embodiments of the disclosure.

As shown FIG. 8B, when the number of the deformations of the set of markers 298 is higher than a predetermined number (e.g., three), the electronic device 200 generates the plurality of signals. In one embodiment, the electronic device 200 may perform operation 804A and operation 804B that respectively correspond to operation 408A and 408B (as shown in FIG. 4). In one embodiment, the electronic device 200 may perform operation 806 that correspond to operation 410 (as shown in FIG. 4). As shown in FIG. 9, examples of the plurality of signals are (X, Y, Θ)=(1, 1, 45 degrees), (2, 2, 45 degrees), and (3, 3, 60 degrees). Those plurality of signals may be respectively transformed to the plurality of input commands, 'Volume Control,' 'Speed Control,' and 'Brightness Control,' as shown in FIG. 9.

As shown in FIG. 8A, at operation 810, when the number of the deformations of the set of markers 298 is equal to or lower than a predetermined number (e.g., three), the electronic device 200 performs a mapping of the plurality of deformations of the set of markers 298 to a second set of input commands. For example, as shown in FIG. 9, the second set of input commands are 'Play/Pause' (mapped to one deformation (tap)), 'Next Song' (mapped to two deformations (taps), and 'Previous Song' (mapped to three deformations (taps)).

What is claimed is:

1. A method performed by an electronic device, the method comprising:
    storing an original configuration of a set of markers in a memory of the electronic device;
    obtaining an image of the set of markers;
    based on the image, detecting an arrangement of the set of markers;
    based on the arrangement of the set of markers, performing a measurement about a deformation of the set of markers, wherein the arrangement of the set of markers is made by a user's touch movement on the set of markers and the deformation of the set of markers corresponds to sub-images of the set of markers;
    based on the measurement about the deformation of the set of markers, generating a plurality of signals by encoding the sub-images of the set of markers using a vision transformer, wherein the plurality of signals correspond to the arrangement of the set of markers and the plurality of signals comprise a first coordinate (X) displacement, a second coordinate (Y) displacement, and an angle (Θ) displacement; and
    transforming the plurality of signals to a plurality of input commands,
    wherein the plurality of input commands are used to control the electronic device,
    wherein the performing the measurement about the deformation of the set of markers comprises:
        based on comparing the original configuration of the set of markers with the image representing the deformation of the set of markers, generating a comparison result, and
        calculating the measurement about the deformation of the set of markers based on the comparison result between the original configuration of the set of markers and the image representing the deformation of the set of markers, and
    wherein the electronic device is an audio device.

2. The method of claim 1, wherein the obtaining the image of the set of markers comprises capturing the image of the set of markers by a camera of the electronic device.

3. The method of claim 1, wherein the detecting the arrangement of the set of markers comprises detecting the arrangement of the set of markers based on an analysis of the image by at least one processor of the electronic device.

4. The method of claim 1, wherein the generating the plurality of signals comprises:
    extracting an affine transform from the deformation of the set of markers, and
    generating the plurality of signals using the affine transform.

5. A method performed by an electronic device, the method comprising:
    storing an original configuration of a set of markers in a memory of the electronic device;
    obtaining an image of the set of markers;
    based on the image, detecting an arrangement of the set of markers;
    based on the arrangement of the set of markers, performing, during a threshold time, a plurality of measurements about a plurality of deformations of the set of markers;
    detecting a number of the plurality of deformations of the set of markers;
    determining whether the number of the plurality of deformations of the set of markers are higher than a threshold number;
    based on a first determination that the number of the plurality of deformations of the set of markers are higher than the threshold number and based on the plurality of deformations of the set of markers, generating a plurality of signals by encoding sub-images of the set of markers using a vision transformer, wherein the plurality of signals comprise a first coordinate (X) displacement, a second coordinate (Y) displacement, and an angle (Θ) displacement; and
    transforming the plurality of signals to a first set of input commands,
    wherein the first set of input commands are used to control the electronic device,
    wherein the performing, during the threshold time, the plurality of measurements about the plurality of deformations of the set of markers comprises:
        comparing the original configuration of the set of markers with the image presenting the plurality of deformations of the set of markers and generating a comparison result, and
        calculating the plurality of measurements based on the comparison result between the original configuration of the set of markers and the plurality of deformations of the set of markers, and
    wherein the electronic device is an audio device.

6. The method of claim 5, further comprising, based on a second determination that the number of the plurality of deformations of the set of markers is equal to or lower than the threshold number, mapping the plurality of deformations of the set of markers to a second set of input commands.

7. The method of claim 5, wherein the obtaining the image of the set of markers comprises capturing the image of the set of markers by a camera of the electronic device.

8. The method of claim 6, wherein the mapping the plurality of deformations of the set of markers to the second set of input commands comprises mapping the number of the plurality of deformations of the set of markers to the second set of input commands.

9. The method of claim 6, wherein the first set of input commands comprises at least one of volume control, speed control or brightness control; and
    wherein the second set of input commands comprises at least one of play/pause, next song or previous song.

10. The method of claim 5, wherein the generating the plurality of signals comprises:

extracting an affine transform from the plurality of deformations of the set of markers, and
generating the plurality of signals using the affine transform.

11. An electronic device comprising:
a camera;
at least one memory storing at least one instruction and an original configuration of a set of markers; and
at least one processer operatively connected to the camera and the at least one memory,
wherein the at least one processor is configured to execute the at least one instruction to:
  obtain an image of the set of markers,
  based on the image, detect an arrangement of the set of markers,
  based on the arrangement of the set of markers, perform a measurement about a deformation of the set of markers, wherein the arrangement of the set of markers is made by a user's touch movement on the set of markers and the deformation of the set of markers corresponds to sub-images of the set of markers,
  based on the measurement about the deformation of the set of markers, generate a plurality of signals by encoding the sub-images of the set of markers using a vision transformer, wherein the plurality of signals correspond to the arrangement of the set of markers, and the plurality of signals comprise a first coordinate (X) displacement, a second coordinate (Y) displacement, and an angle ($\Theta$) displacement, and
  transform the plurality of signals to a plurality of input commands,
wherein the plurality of input commands are used to control the electronic device,
wherein the performing the measurement about the deformation of the set of markers comprises:
  based on comparing the original configuration of the set of markers with the image representing the deformation of the set of markers, generating a comparison result, and
  calculating the measurement about the deformation of the set of markers based on the comparison result between the original configuration of the set of markers and the deformation of the set of markers, and
wherein the electronic device is an audio device.

* * * * *